US006713757B2

(12) United States Patent
Tanner et al.

(10) Patent No.: US 6,713,757 B2
(45) Date of Patent: Mar. 30, 2004

(54) CONTROLLING THE TEMPORAL RESPONSE OF MASS SPECTROMETERS FOR MASS SPECTROMETRY

(75) Inventors: Scott D. Tanner, Aurora (CA); Dmitry R. Bandura, Aurora (CA); Vladimir I. Baranov, Richmond Hill (CA); Steven A. Beres, Monroe, CT (US)

(73) Assignee: MDS Inc., Concord ( * ) Notice: Subject to any disclaimer, the term of this patent is extended or adjusted under 35 U.S.C. 154(b) by 398 days.

(21) Appl. No.: 09/796,609

(22) Filed: Mar. 2, 2001

(65) Prior Publication Data

US 2002/0121597 A1 Sep. 5, 2002

(51) Int. Cl.[7] .......................... H01J 49/42; B01D 59/44

(52) U.S. Cl. ....................... 250/288; 250/281; 250/282; 250/292

(58) Field of Search ................................ 250/281, 282, 250/292, 288

(56) References Cited

U.S. PATENT DOCUMENTS

| | | | | |
|---|---|---|---|---|
| 5,847,386 A | | 12/1998 | Thomson et al. | 250/288 |
| 6,140,638 A | | 10/2000 | Tanner et al. | 250/282 |
| 6,177,668 B1 | | 1/2001 | Hager | |
| 6,194,717 B1 | * | 2/2001 | Hager | 250/282 |
| 6,417,511 B1 | * | 7/2002 | Russ, IV et al. | 250/292 |

OTHER PUBLICATIONS

Le Blanc, Scott, Plomley , and Stott, "Improving the Transmission of Ions Through a High–Pressure Quadrupole Collision Cell", 46th ASMS Book of Abstracts, p. 1254, 1998.

Morrison, Stanney, and Tedder, "The Design and Development of a Quinquequadrupole Mass Spectrometer", 34th ASMS Book of Abstracts, pp. 222–223, 1986.

Thomson, Jolliffe, and Javahery, "RF–Only Quadrupoles with Axial Fields", 44th ASMS Book of Abstracts p. 1155, 1998.

Javahery and Thomson, "A Segmented Radiofrequency–Only Quadrupole Collision Cell for Measurements of Ion Collision Cross Section on a Triple Quadrupole Mass Spectrometer", American Society for Mass Spectrometry, pp. 697–702, Mar. 1997.

Loboda, Krutchinsky, Loboda, McNabb, Spicer, Ens, and Standing, "Novel LINAC II Electrode Geometry to Create an Axial Field in a Multipole Ion Guide", University of Manitoba, 48th ASMS, Paper #WPA0116, 2000.

Lock and Dyer, "Characterisation of High Pressure Quadrupole Collision Cells Possessing Direct Current Axial Fields", Rapid Communications in Mass Spectrometry, pp. 432–448, 1999.

Mansoori, Dyer, Lock, Bateman, Boyd, and Thomson , Analytical Performance of a High–Pressure Radio Frequency–Only Quadrupole Collision Cell with an Axial Field Applied by Using Conical Rods, Elsevier Science, Inc., pp. 775–788, 1998.

(List continued on next page.)

*Primary Examiner*—Nikita Wells
(74) *Attorney, Agent, or Firm*—Bereskin & Parr

(57) ABSTRACT

A method and apparatus for operating a mass spectrometer system, having a processing section, provides for the application of both an axial field and periodic application of a flush pulse to the processing section. This gives a reproducible output ion signal from the processing section that is very responsive to changes in operating conditions in the processing section. The mass spectrometer system can comprise: a collision/reaction cell having an input and an output; and a set of elongated rods extending between said input and output, said elongated rods spatially arranged. Separate auxiliary electrodes can be provided to generate the axial field. The invention has particular applicability to ICP-MS, where strong ion currents can result in a collision cell taking some time to reach equilibrium when the operating condition is changed.

39 Claims, 8 Drawing Sheets

OTHER PUBLICATIONS

Bandura and Tanner, "Effect of Collision Damping in the Dynamic Reaction Cell on the Precision of Isotape Ratio Measurements", Atomic Spectrometry, pp. 69–72, Mar./Apr. 1999.

Bandura, Baranov, and Tanner, "Effect of Collisional Damping and Reactions in a Dynamic Reaction Cell on the precision of Isotope Ratio Measurements", The Royal Society of Chemistry, pp. 921–928, 2000.

Hattendorf and Günther, "Characteristics and Capabilities of an ICP–MS with a Dynamic Reaction Cell for Dry Aerosols and Laser Ablation", J. Anal. At. Spectrom, pp. 1125–1131, 2000.

* cited by examiner

CONTROLLING THE TEMPORAL RESPONSE OF MASS SPECTROMETERS FOR MASS SPECTROMETRY

FIELD OF THE INVENTION

This invention relates to controlling the temporal response of mass spectrometers, and particularly to detecting ions of interest by mass spectrometry, wherein ions are processed through a section of a mass spectrometer that operates under conditions enabling ion-neutral collisions. More particularly, this invention is concerned with a technique to enable an existing charge distribution in such a processing section to be flushed out rapidly and then quickly reestablished, so as to give, at an output, a reproducible and quickly repeatable ion current, thereby to give better control of the temporal response.

BACKGROUND OF THE INVENTION

In mass spectrometry, a reaction and/or collision cell is often employed (to remove an isobaric interference through reaction or fragmentation with a reaction/collision gas, or shift the ion of interest to another mass by reacting with a reaction gas, or fragment the ion of interest and collect the fragment ions for subsequent mass analysis). Collision or reaction cells have the problem that, due to the high pressure necessary present within them, flow of ions can be slowed. In a variety of standard mass spectrometer operating regimes, this can cause difficulties, since it is often required to switch, rapidly, between different top operating states. However, for collision cells, when the operating state is changed, it can take some time for an output ion stream to stabilize, due to the slow ion motion through the collision cells and space charge effects within the collision cell. There are also other sections of standard mass spectrometer systems which can also slow motion of ions and show slow response times to changes in operating conditions. For example, some mass spectrometers can have mass analysis sections that operate at relatively high pressures, and, in many mass spectrometer systems, it is common to have an input section with a focusing multipole device interposed between an atmospheric pressure source and the high vacuum sections of the mass spectrometer, the input section operating at some intermediate pressure. Thus, all these sections pose problems for an operating scheme where the operating state is required to change rapidly.

It is also to be recognized that, in the field of mass spectrometry, there are large numbers of different mass spectrometers. For many purposes, these can be broken down into two broad categories. In one category, mass spectrometers are configured to analyze inorganic analytes. One common technique is inductively coupled plasma mass spectrometry (ICP-MS). An inductively coupled plasma source has, for example, an argon gas that is excited by inductive heating, to generate a plasma. The analyte is then injected into the plasma, where it is ionized. While this does effectively ionize the analyte, the resultant ion stream into the mass spectrometer provides a very large ion current, including a significant proportion of argon ions or other ions derived from the sample. This can lead to significant space charge effects within a collision/reaction cell.

The second significant category of mass spectrometers is that intended for analyzing organic compounds or analytes. Organic compounds commonly have large, complex structures, and must be ionized with some care, to avoid unwanted degradation or premature fragmentation of the analytes. Common ionization techniques include electrospray, nanospray and the like. Other ionization sources include glow discharge, microwave induced plasma, (both of these are also quite common in inorganic mass spectrometry) corona discharge, etc. It is becoming common practice, for analysis of organic compounds, to provide complex reaction schemes, where analytes are fragmented by collision or reaction, and a particular fragment is selected and then subject to a subsequent stage of collision or reaction. Systems have been proposed that would enable any desired number of steps of fragmentation and ion selection to be affected. It will also be understood that, within any mass spectrometer system, a variety of different reaction/collision cells (e.g. high order multipoles, ring guides and the like) can be used, and similarly that a variety of mass analysis sections can be employed (e.g. time of flight, magnetic sectors, ions traps, etc.).

Some of the inventors of the present application had previously developed an improvement to the basic ICP-MS system that provides for applying a pass band, to the collision cell. This mass spectrometer system is now identified as a Dynamic Reaction Cell (DRC) and is marketed by the assignee of the present invention. This essentially recognizes that while true mass filtering cannot be achieved in the collision cell, it is possible to apply a pass band, so as to reject ions that have m/z ratios substantially different from an ion of interest. This can be used to interrupt sequential chemistry that occurs within the collision cell, which can result in interferences with ions of interest. This Dynamic Reaction Cell is disclosed in U.S. Pat. No. 6,140,638, and like other instruments with collision/reaction cells, there can be problems in the time taken for the reaction cell to reach equilibrium following a change in operating conditions.

As noted, a problem with a collision cell is that when there is any substantial change in the operating condition, e.g. a change in the input ion current or change in fields applied to the cell, this should be reflected in the ion current output from the collision cell, but often it takes some time for the establishment of a new, stable charge distribution within the cell. During this time, an ion stream extracted from the cell can show fluctuations or transients. As ion motion is slowed within the collision/reaction cell, it simply takes time for ions to travel through the collision/reaction cell. Particularly for ICP-MS, the stronger ion current leads to a strong space charge effect, which can also significantly affect the ion density distribution and slow down changing of the ion population to reflect the new operating state. The present inventors have observed prolonged recovery of tho ion population, when the ion density is changed through a wide variety of different inputs. If the degree to which the ion density is changed is variable, the period of recovery is also variable.

It is to be noted that in the case of the DRC, common practice is for the bandpass of the, or the electrical parameters of the, reaction cell to be adjusted in concert with the mass selected by a down stream mass analyzer. Capacitive coupling between the collision/reaction cell and the mass analyzer can be provided but generally this does not provide the required bandpass. When a large jump in mass is executed, with the band pass of the DRC concomitantly adjusted, this can result in dominant ions previously included in the band pass being excluded, or vice versa. Typically, following a large jump in mass, the ion signal from the collision/reaction cell is initially suppressed and increases to a stable level but it is possible that the opposite could occur.

The issue of moving ions through pressurized sections of mass spectrometers, more specifically through collision cells, has been addressed in instruments intended primarily for analyzing organic analytes. Thus, U.S. Pat. No. 5,847,386 (assigned to the assignee of the present invention) discloses a mass spectrometer which provides for an axial field in high pressure sections of a mass spectrometer. These high pressure sections, in the disclosed embodiment, have quadrupole rod sets and a number of techniques are disclosed for applying the axial field to these rod sets. For example, the rods can be specifically shaped or orientated to generate the axial field, or an auxiliary rod set can be provided to generate the axial field, or the rod set can be segmented, to enable segments to be held at different DC potentials.

U.S. Pat. No. 5,847,386 is primarily concerned with a triple quadrupole instrument, in which a collision cell is located between two mass analysis sections. It proposes using the axial field to promote motion of ions through the collision cell, and in particular to promote clearing out of ions from the collision cell, when the operating state is changed. This also has the additional advantage of improving sensitivity, often by a factor of 2 to 5 in practice. As is known, such triple quadrupole instruments are often scanned over a range of masses, with each measurement being taken in a relatively short time period, so that it is essential that there is no leaking out of ions from a previous operating state, after the mass spectrometer has been switched to a second operating state to detect a different ion. The patent notes that it is common practice to provide a first quadrupole rod set, commonly identified as Q0 for focusing and directing ions and providing an interface between an atmospheric pressure source and a low pressure mass analyzer section. It additionally notes that, for reasons of economy, it is common for Q0 to be provided with an RF supply from the downstream mass analyzer through capacitors. When there is a jump or significant change in RF and/or DC voltages applied to the mass analyzer, transient processes delay establishment of the desired voltages on the Q0, resulting in ejection of some ions from Q0. It is stated that mass spectrometer builders have lived with this problem because of the very high cost of providing a separate RF power supply for Q0. It is then suggested that by providing an axial field in Q0, the time to refill Q0 can be reduced. Thus, the teaching is that clearing all the ions out of a section of the mass spectrometer is generally undesirable, and there is no recognition that being able to establish a repeatable, emptied state for a section of the instrument may have advantages. Further, due to the intended application of this type of mass spectrometer, there is no discussion of the space charge effects, and particularly no recognition that a substantial space charge barrier can clay a significant role in preventing rapid response of a collision/reaction cell to changing operating conditions.

While providing a linear axial field has many advantages, it does not, by itself, necessarily result in a rapid response of a collision cell. It can reduce the transit time of ions through the cell. However, if the space charge is significant relative to the applied field, the effectiveness of the axial field in establishing the necessary gradient to drag or accelerate ions through the cell is reduced, i.e. if a space charge barrier exists within the cell, an applied axial field can be off-set or shielded by the space charge. However, where the initial space charge is small relative to the applied field, the application of the field establishes an axial gradient that sets up a condition that minimizes formation of a space charge barrier within the cell. Provided the space charge of ions within the cell is insignificant relative to the applied field, a fast temporal response is obtained and a measured ion signal is reproducible, so that the settling time may be reduced. Alternatively, provided the charge distribution within the cell is approximately unchanged (or at least that the space charge field remains relatively constant relative to the applied fields), a fast temporal response is obtained and the measured ion signal is reproducible, though the signals may be suppressed, so that again settling time may be reduced.

Before the introduction of the commercial version of the DRC, it had been recognized by some of the present inventors that the slow recovery of the ion signal following a change of the DRC bandpass causes suppressed signals if insufficient time (called the settling time) is allowed for recovery. It was also recognized that the reproducibility of the state of the DRC after such a change was dependent on the current and mass distribution of the ions introduced into the cell. To partially address this problem, an optional flush pulse was implemented in the DRC product to reproducibly define the state of the DRC after each bandpass change (before each measurement) though it was not obvious to the user that this option was available. The slow recovery following the flush pulse could not be addressed at that time. As a result, although reproducible signals could be achieved in most cases by applying the flush pulse, those signals were typically unacceptably lower than a steady state signal when a practical (relatively short) settling time was allowed. As a result, the flush pulse although available for use was rarely if ever used in practice. It is also the inventors' understanding that similar functionality is available on other products and from other manufacturers though it is unclear whether or not this generally known.

It should be realized that the flush pulse method alone does not necessarily provide for reproducible signals in the instance that the composition of the sample is changed, since the ion distribution that reestablishes during the settling period can be affected by the presence of absence of, for example, a concomitant element. That is, the settling time that is sufficient for signal recovery to a particular reproducible level after a certain bandpass change for one sample may allow the signal for the same analyte ion at the same concentration in a different sample to recover to a completely different level, due to a difference in the concomitant elements and their concentration between the samples. Also, since the measurement is usually performed on a recovering, i.e., changing, signal, the result of the measurement is dependent on the measurement duration (often called the dwell time), so that the number of ions detected per unit time depends on the dwell time.

SUMMARY OF THE INVENTION

It is to be appreciated that the flush pulse technique and the axial field technique are essentially opposite techniques, though they may be attempting to deal with the same problem, i.e. the slow response of collision cells and reaction cells and high pressure regions, e.g. mass analysis sections that operate under pressures sufficient to affect ion transport of mass spectrometers to changing operating states. The flush pulse fundamentally is Intended, in each instance, to flush out the existing charge distribution, so as to return the collision, reaction cell or other section of the mass spectrometer to a known, emptied state. This certainly can give a reproducible response, but as it can take some time for the charge to reestablish itself, this can make the temporal response longer. On the other hand, the use of an axial field takes an opposite approach. It does not attempt to flush out any preexisting charge distribution, but rather applies the field to accelerate ions, with the intention of reducing residence times within a collision cell or the like thereby causing an ion population to change more quickly when the operating state is charged.

What the present inventors have realized is that combining a flush pulse with an axial field can, surprisingly, provide a number of advantages. A flush pulse provides a reproducible charge distribution at the start of the settling period, again because the collision/reaction cell of the mass spectrometer system will always be starting from the same, emptied state. Consequently, the resultant signal should be less dependent, it not wholly independent, on the prior charge distribution within the cell. At the same time, the axial field provides rapid transit of ions during the settling period, resulting in rapid refilling of a collision cell or the like. This in turn results in a rapid response time, so that the settling time may be reduced. Because the flush pulse eliminates the dependence of the ion signal on the prior charge distribution history of the cell, and because the axial field provides rapid response, the combination provides a rapid temporal response. Although the time required for full recovery of the signal to its steady state value may still depend on the composition of the sample, this time is made short by application of the axial field. As a result, a relatively short and constant settling time can be used for all samples to give reproducible results, provided that the settling time is longer than the longest recovery time. According to the experimental data obtained for a variety of samples by the inventors, 10 ms combined flush pulse duration plus settling time was sufficient in all cases.

The actual device for implementing the linear axial field may be any configuration described in U.S. Pat. No. 5,847,386. However, the tilted rod and tapered rod configurations are not compatible with the establishment of a well defined bandpass through the cell. Segmented rods are applicable to the present invention, but their enactment is awkward and they do not generate a continuous axial field or potential gradient (there are sequential periods of acceleration/deceleration, which adversely affects the temporal response). A further means of providing an axial field is to arrange electrodes external to the multipole such that an external axial field penetrates through the openings between the multipole rods and produces an axial field (though at relatively reduced field strength) inside the multipole. It is believed that most suitable configuration is that using auxiliary electrodes located between the rods of a multipole rod set. These are typically (but not necessarily) shaped so as to generate a nearly linear field along the multipole axis.

BRIEF DESCRIPTION OF THE DRAWINGS

For a better understanding of the present invention and to show more clearly how it may be carried into effect, reference will now be made, by way of example, to the accompanying drawings.

DETAILED DESCRIPTION OF THE INVENTION

Figure 1:
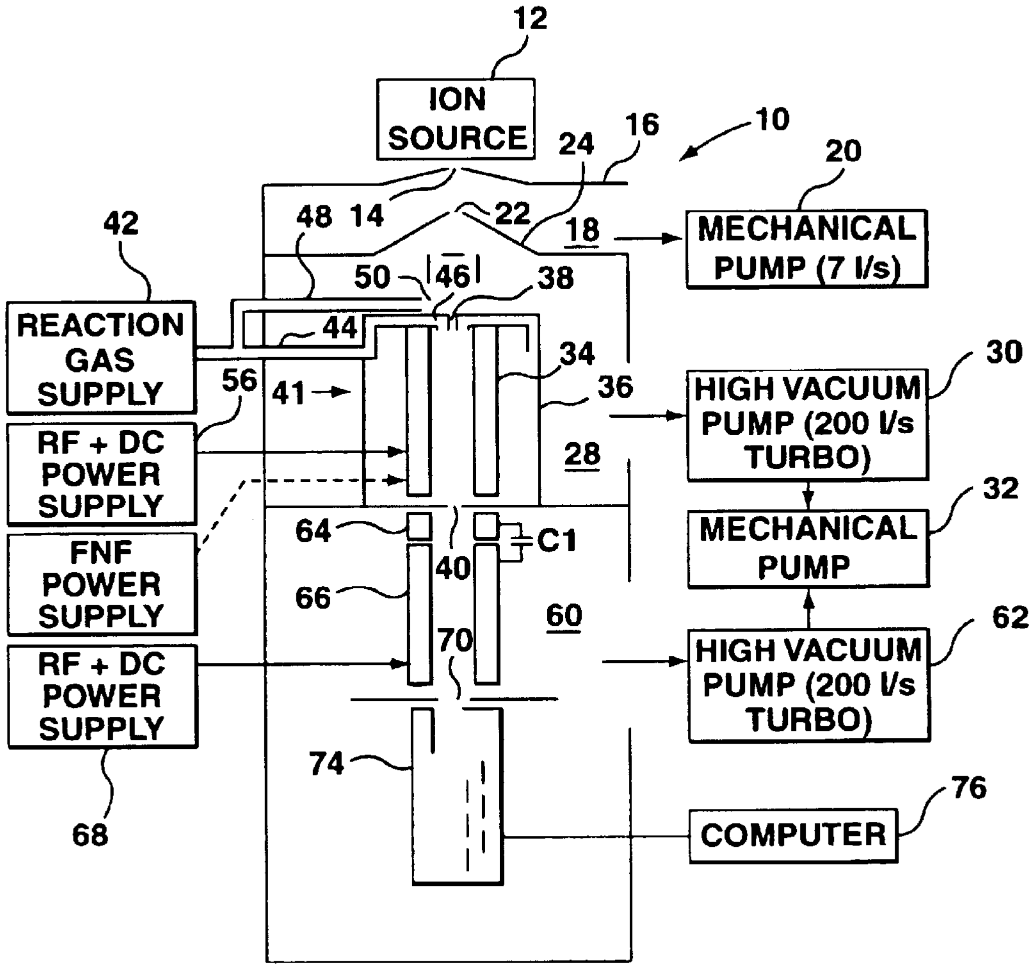
FIG. 1 (PRIOR ART)
FIG. 1 illustrates a mass analyzing apparatus according to a prior art device.
Figure 2A:
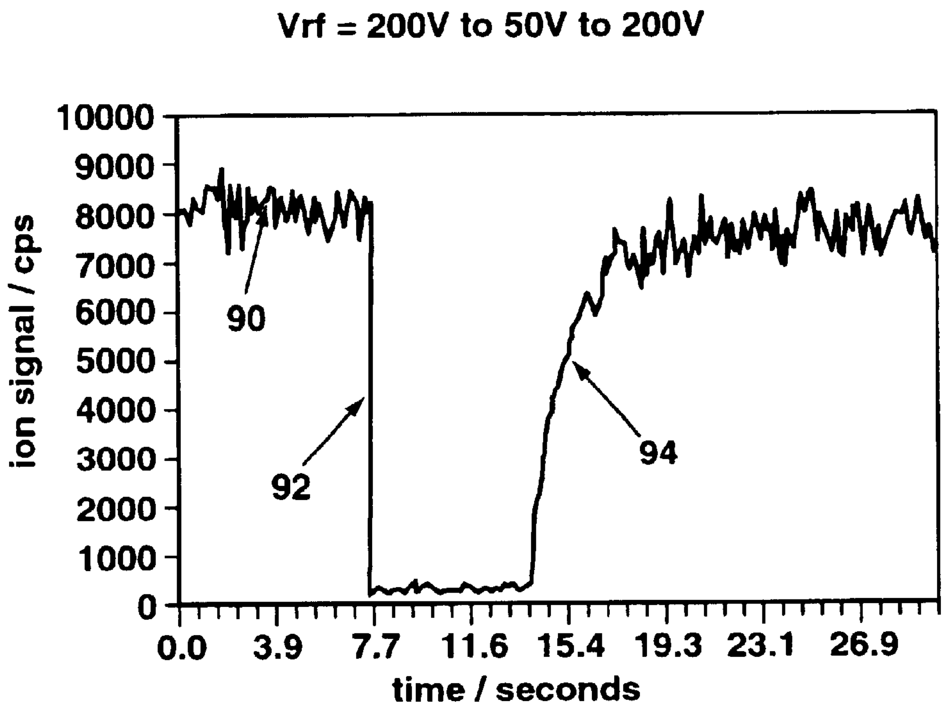
FIG. 2 illustrates a time delay in establishing a stable ion signal within a collision/reaction cell following a change in operating conditions.
Figure 2B:
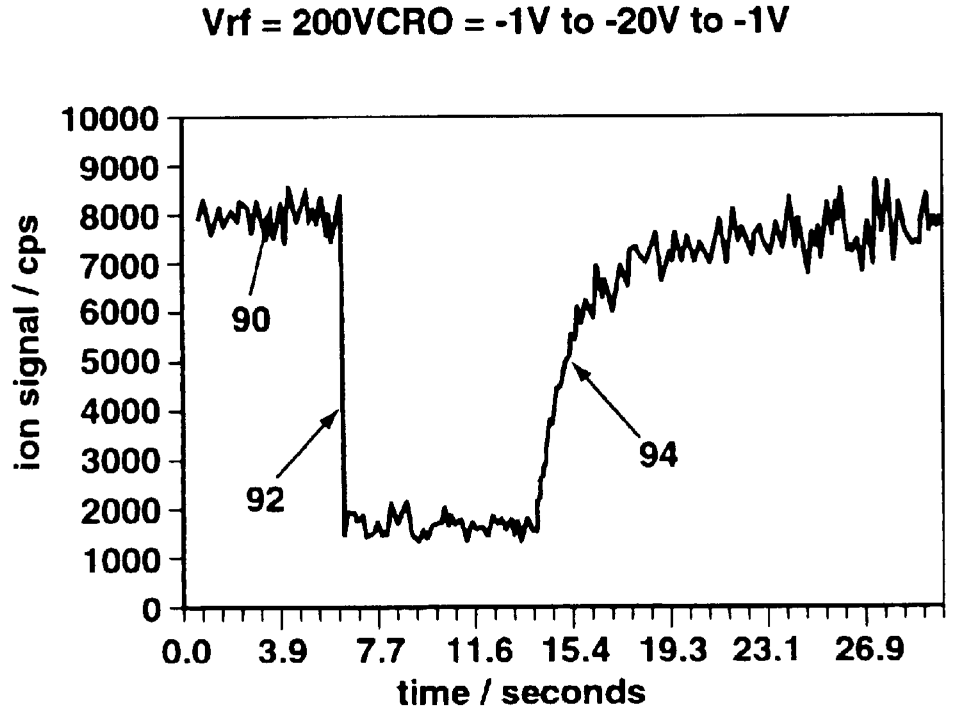
Figure 2C:
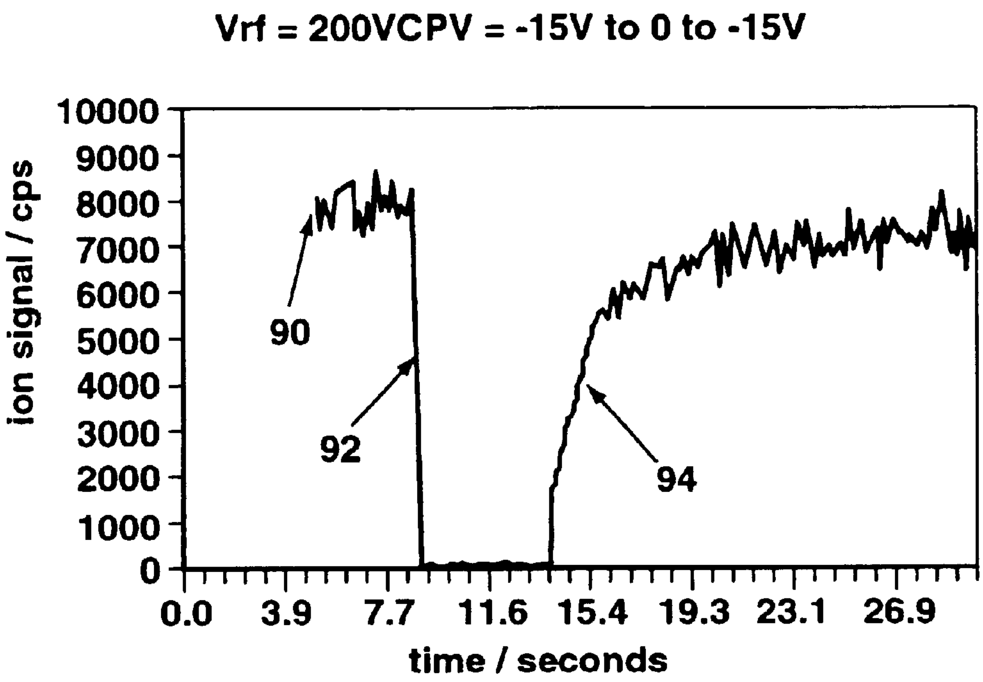
Figure 2D:
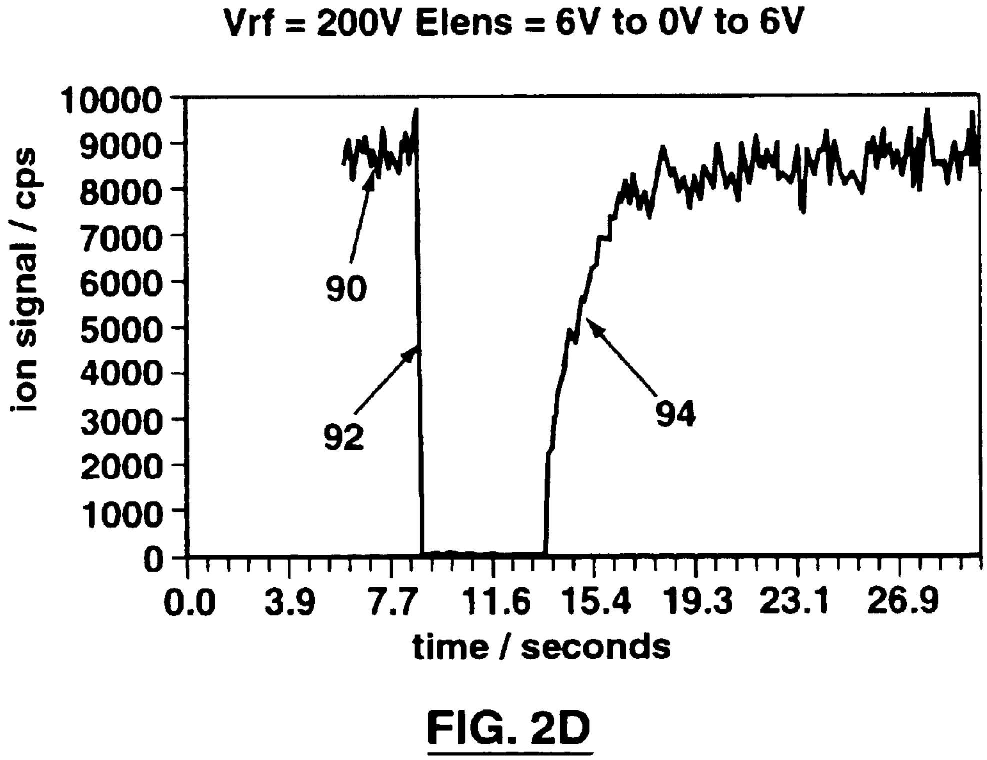

FIG. 1 illustrates a mass spectrometer system 10 as disclosed in U.S. Pat. No. 6,140,638, assigned to the same assignee as the present invention, and the contents of which are hereby incorporated by reference. The system 10 comprises an inductively coupled plasma source 12, a collision/reaction cell 41, a pre-filter 64 and a mass analyzer 66. It is to be understood that the cell 41 can be configured and used for one or both of collision and reaction between a gas introduced into the cell 41 and ions entering the cell 41. The inductively coupled plasma source 12 ionizes a sample material for analysis, and then injects it in the form of a stream of ions through a first orifice 14 in a sample plate 16. As the stream of ions pass through the first orifice 14, they enter into a first vacuum chamber 18 evacuated by a mechanical pump 20 to a pressure, of for example, 3 torr. The stream of ions passes on through the first chamber 18, and through a second orifice 22 in a skimmer plate 24. As the stream of ions pass through the second orifice 22, they enter a second vacuum chamber 28, which is evacuated to a lower pressure (e.g. 1 millitorr) by means of a first high vacuum pump 30. Within the second vacuum chamber 28, the ion stream enters a quadrupole 34 through entrance aperture 38. The quadrupole 34 is loaded in a can or housing 36 to form a collision cell 41.

Reactive collision gas is supplied from a gas supply 42 and can be supplied in any known manner to the interior of can 36. As shown, the collision gas can be arranged to flow through a conduit 44 and out through an annular opening 46 surrounding orifice 38. As the collision cell 41 is at a higher pressure than the chamber 28, gas exits into chamber 28 through aperture 38, against the ion current flow. This gas flow prevents or reduces unionized gas from the source 12 from entering the can 36. A secondary conduit 48 from gas supply 42 terminates at a position 50 just in front of the orifice 38, so that reactive collision gas is directed into the ion stream before it enters quadrupole 34. The position 50 can in fact be any position upstream of the orifice 38, and downstream of the ion source 12.

The mass spectrometer system 10 is primarily intended for analyzing inorganic analytes. For this purpose, the inductively coupled plasma source 12 commonly utilizes argon gas that is subject to a field that, through induction, excites and ionizes the argon gas. An analyte sample is injected into the resultant ionized plasma, causing ionization of the analyte. The plasma, comprising argon and analyte ions, passes through the orifice 14, as indicated. Such a plasma has a large concentration of ions, many of which are unwanted ions of argon or argon compounds. Consequently, it is highly desirable to eliminate or reduce interferences caused by unwanted ions, and the collision/reaction cell 41 is used for this purpose. U.S. Pat. No. 6,140,638 is directed to a bandpass technique that, essentially, interferes with chemical reaction sequences that can generate new interferences inside the cell 41.

While this approach has many advantages, as mentioned, there is a problem in that ion signals take a period of time to stabilize after a change in the bandpass state of the collision cell or dynamic reaction cell 41. The change in the bandpass state can result in some ions becoming stable within the cell which were previously unstable, or vice versa. The problem is more severe in ICP-DRC-MS, because of the high intensity ion source and because the bandpass of the collision or dynamic reaction cell is adjusted for each analytical measurement. As such, the invention is described here as applied to such an ICP-DRC-MS configuration.

However, it is to be understood that the invention is not limited to this application, and further that details of the spectrometer system described can be varied in known manner. For example, while the collision cell 41 is described as having a quadrupole 34, it will be understood that any suitable electrode configuration can be used. More particularly, other multipoles, e.g. hexapoles and octapoles, could be used.

Additionally, it will be understood by those skilled in the art that the invention could have application to other types of spectrometers. For example, a different class of spectrometers is configured for analyzing organic analytes. Commonly, organic analytes are ionized using an electrospray source or some other equivalent source, which, unlike the inductively coupled plasma technique, is not such a high intensity technique and hence does not normally generate the same problems due to space charge limitations Nonetheless, such spectrometers do include collision cells, and there may be advantages of employing the technique of the present invention, with a combined flush or clearing pulse and axial DC field, in such a spectrometer.

It will also be understood that the mass analyzer of the disclosed apparatus, detailed below, can be replaced by any suitable mass analyzer.

In accordance with U.S. Pat. No. 6,140,638, the quadrupole is operated to provide a desired bandpass. Thus the quadrupole can be operated as an RF-only device, i.e. as an ion transmission device, which is a low mass cutoff bandpass device, i.e. it allows transmission of ions above a set of m/z value. However, low level resolving DC may also be applied between the rods, to reject unwanted ions both below and above a desired pass band. These voltages are supplied from a power supply 56.

Ions from dynamic reaction cell or collision cell 41 pass through an orifice 40 and enter a third vacuum chamber 60 pumped by a second high vacuum turbo pump 62 with a mechanical pump 32 backing up both the high vacuum pumps 30, 62. The pump 62 maintains a pressure, of for example, $1\times10^{-5}$ torr in the vacuum chamber 60. These ions travel through a pre-filter 64 (typically an RF-only short set of quadrupole rods) into a mass analyzer 66 (which is typically a quadrupole but, as noted, may also be a different type of mass analyzer such as a time-of-flight mass spectrometer, a sector instrument, an ion trap, etc., and appropriate minor changes to the arrangement shown would be needed for some other types of spectrometers). The quadrupole 66 has RF and DC signals applied to its rods from a power supply 68 in a conventional manner, to enable scanning of ions received from dynamic reaction cell 41. Typically, the prefilter 64 is capacitively coupled to the quadrupole 66 by capacitors C1, as is conventional, thus eliminating the need for a separate power supply for the pre-filter 64.

From the quadrupole 66, the ions travel through an orifice 70 in an interface plate 72 and into a detector 74, where the ion signal is detected and passed to a computer 76 for analysis and display.

The mass spectrometer system 10 provides a bandpass tunable collision cell or dynamic reaction cell 41, where varying or tuning the RF voltage amplitude, the DC voltage and/or the RF frequency (by means of power supply 56) to the quadrupole 34 controls the band (or m/z range) of ion masses transmitted through to the third vacuum chamber 60. The low mass end of the bandpass is defined primarily by the RF amplitude and frequency supplied to the quadrupole 34, where the high mass end of the transmission window is primarily defined by the DC voltage amplitude applied between pole pairs of the quadrupole 34. Hence, only the m/z range of interest is selectively coupled to the mass analyzer. This eliminates intermediates or interference ions, before they have an opportunity to create isobaric or similar interferences.

Often high resolution is not available at the pressures present in the collision cell 41. Thus, in a wide bandpass dynamic reaction/collision cell, true mass filtering is neither obtainable nor is it provided, and high pressures of the order of 10 to 50 mTorr can be present. However, there may be mass filters which do operate at elevated pressure, where the techniques of the present invention can be provided to enhance significantly the response.

The ion density distribution in the pressurized reaction/collision cell 41 is changed when the input ion current entering through the orifice 38 is changed. Also, the ion density distribution in the pressurized reaction/collision cell 41 changes as a result of field changes within reaction/collision cell 41. Field changes in the reaction/collision cell 41 can result from varying the RF amplitude, the RF frequency or the DC voltage for setting a pass band applied to the quadrupole 34. Other examples include changing conditions for notch filtering or broad band excitation. For significant changes, e.g. for a significant change in the applied pass band, some ions may become stable that were not stable before, and/or ions that were stable, are no longer stable and are rejected. Thus, changes in ion density distribution causes corresponding changes in charge distribution within the reaction/collision cell 41, and consequently changes in charge distribution can affect the rate at which ions are extracted from the cell because the charge density is sufficiently large to affect the local potential field. This in turn affects the measurements at the detector 74 and computer device 76.

The establishment of a stable charge distribution within the reaction/collision cell 41 can take an appreciable period of time following changes in ion density distribution. As a result of these changes in ion density distribution, the rate of ion extraction can change. Therefore, the rate of establishment of a stable ion density in the reaction/collision cell 41 affects the rate of stabilization of ion signals detected downstream.

As detailed below, various practices can affect the charge distribution within the dynamic reaction or collision cell 41. Unfortunately, any of these changes will, generally, produce a transient or fluctuation in the charge distribution within the cell 41, and hence a transient or fluctuation in the extraction rate of any particular ion. Moreover, this transient of fluctuation will depend not just on the new operating conditions, but also on the prior operating state of the cell 41. Hence, conventional teaching has been that following any significant change in the charge distribution, time must be provided to allow the establishment of a stable charge distribution or population within the cell 41, which in turn will ensure that the ion flow from the cell 41 also stabilizes to a constant or uniform condition. However, it can take an appreciable settling time for the charge distribution and ion flow from cell 41 to settle down to stable values, following a change in operating state. Following conventional teaching, during this settling time, no useful readings can be taken of available ion signal. This degrades the overall sensitivity, since a portion of the available ion stream is essentially discarded, until the system stabilizes. It also decreases the useful scan rate, and hence affects the duty cycle; see, for example, "Characteristics and capabilities of an ICP-MS with dynamic reaction cell for dry aerosols and laser ablation", Bodo Hattendorf and Detlef Günter, Journal of Analytical Atomic Spectroscopy, 2000, 15, p.1125–1131.

The prolonged recover of ion signals due to changes in ion density distribution in the cell can be attributed to several factors. Examples of relevant factors are changes in the ion current introduced into the reaction/collision cell 41 (i.e. variation of a time-dependent ion source, or through modulation of the input ion optics), adjustment of the reaction/collision cell 41 end cap voltages, adjustment of the applied DC offset voltage (i.e., the common, or rod offset, voltage applied to all the rods together) to the quadrupole 34, adjustment of the applied RF amplitude to the quadrupole 34, adjustment of the applied RF frequency to the quadrupole 34 and the adjustment of the DC resolving voltage difference between both elongate rod pairs of the quadrupole 34. It will be appreciated that if the magnitude of "ion density changes" is variable, the period of recovery will also be variable. This causes the measured ion signal to be unstable. As mentioned, similar effects could occur in a high pressure mass analyzer.

In the spectrometer system 10, the bandpass of the reaction/collision cell 41 is adjusted in concert with the downstream mass analyzer 66 for a specific mass range over which measurements are to be made. If the mass analyzer 66 executes a jump in mass, the reaction/collision cell 41 mass window is accordingly adjusted. Note also that the pass band for the cell 41 is not necessarily centered around the mass set in the mass analyzer 66, i.e. the shift for the pass band may be greater than or less than the mass shift for the mass analyzer 66. If the bandpass of the reaction/collision cell 41 is adjusted to include or exclude a dominant ion, or the analyte mass did not fall within the bandpass of the previous setting but is now included in the new bandpass, the charge within the reaction/collision cell 41 is affected. Also, if the bandpass of the reaction/collision cell 41 is changed significantly, the ions that were previously stable in the cell become unstable and a new range of charges fall within the stability bandpass. As a result of this bandpass change, it can take an appreciable time period for the charge distribution in the reaction/collision cell 41 to become stable. Until the charge distribution stabilizes, the ion signal obtained at the exit of the cell changes. Therefore, the time response of the spectrometer 10 when scanning subsequent mass ranges is limited by the time period required for obtaining a stable charge distribution in the reaction/collision cell 41. Typically, during a bandpass change, the ion signal is initially suppressed and increases to a stable level. Alternatively, the ion signal may initially be large and decrease to a stable level. In the reaction/collision cell 41, the bandpass is intentionally adjusted with each analytical mass by adjusting the R F frequency provided by power supply 56 to the quadrupole 34. The bandpass can also be adjusted by changing the RF amplitude (Vrf). An example of slow recovery of an ion signal to a stable level following a bandpass adjustment is shown in FIG. 2

FIG. 2 illustrates the time delay in establishing a stable ion signal following the adjustment of various reaction/collision cell 41 parameters. The ion signals measured during several experimental tests are shown on the graphs such that re-establishment of the original cell conditions coincide (near 14.1 seconds). In each test, one cell parameter was adjusted from its optimum to reduce the ion signal, and then the original optimum value was re-asserted. The parameters changed include the RF amplitude Vrf (200 to 50 to 200 V) in FIG. 2*a*, the rod offset (common) DC voltage (−1 to −20 to −1 V) in FIG. 2*b*, the end cap voltage CPV (15 to 0 to 15 V) in FIG. 2*c*, and the ion optic lens in front of the cell Elens (6 to 0 to 6 V) in FIG. 2*d*. As illustrated in FIG. 2, the ion signal was first stabilized, as indicated by 90. The ion signal decreases as the reaction/collision cell 41 parameters are changed from their optimum, as indicated by 92. As observed, the ion signal slowly recovers over a period of time (response-time) when the original cell parameters are re-asserted, as indicated by 94. The response-time of the ion signal is a function of the conditions within the reaction/collision cell 41 (pressure, RF and DC amplitudes applied to quadrupole rod pairs and end cap voltages, and also rod offset and possibly the type of gas and the energy of the ions at the entrance of the cell), the ion current introduced into the reaction/collision cell 41 and the ion density within the reaction/collision cell 41. For instance, the higher the pressure within the reaction/collision cell 41, the slower the response-time of the ion signal following a bandpass change within the reaction/collision cell 41. The response-time of the ion signal within the reaction/collision cell 41 is also increased when the ion current entering the reaction/collision cell 41 is high. This is particularly the case with the inductively coupled plasma (ICP) ion source 12 which generates a high current of ion signals. The high ion current can in turn cause the charge density in the cell to become space-charge limited. This may produce a space-charge barrier which contributes to the slow response time for establishing a stable charge distribution within the reaction/collision cell 41.

Accordingly, the present invention is based on the realization that it is desirable to improve the response-time of ion signals within a reaction/collision cell. It has been already established in the art of spectrometry that by providing an axial DC field within a reaction/collision cell, the temporal response of the spectrometer system 10 is improved.

In the following, reference is made to a "settling time" and a "dwell time". A "settling time" is the time period that the apparatus is permitted to settle after a change in operating conditions. The length of time that is used to take a reading or detect ions is called the "dwell time". As FIG. 2 shows, there can be an exponential recovery of the measured ion signal to a steady state value. In practice, it is not necessary to wait for the steady state to be reached. Provided the ion current is constant and other parameters remain the same, the results can be reproducible though the measured signal may be different for different settling and dwell times. One can determine a settling time that starts a measurement period before a steady state signal is established.

Figure 3A:
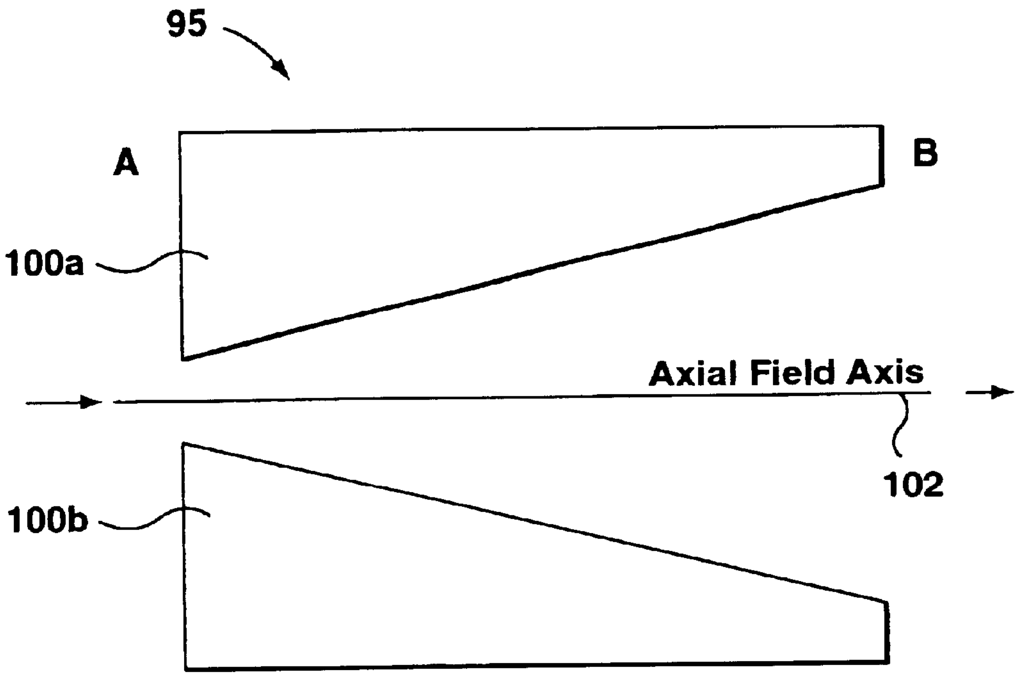
FIG. 3A (PRIOR ART)
FIG. 3*a* illustrate a side view of a quadrupole within the collision/reaction cell.
Figure 3B:
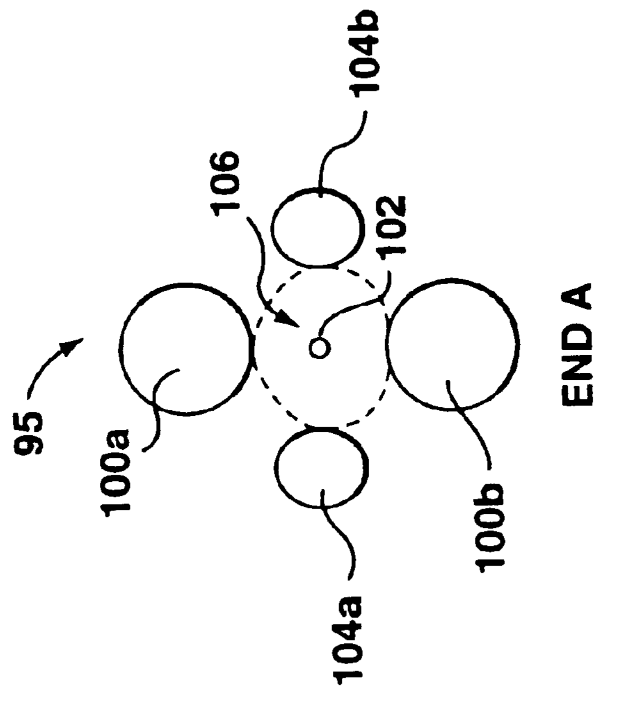
FIG. 3B (PRIOR ART)
FIG. 3*b* illustrates a first end view of the quadrupole illustrated in FIG. 3*a;*
Figure 3C:
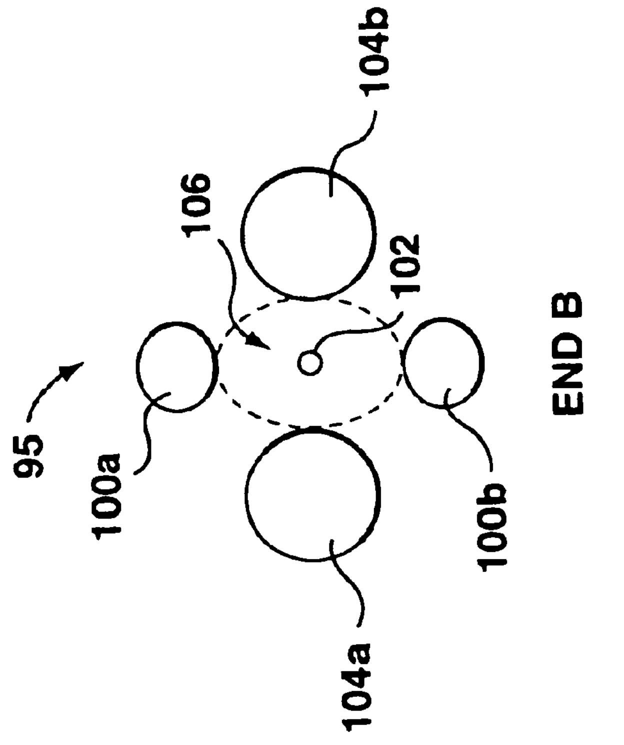
FIG. 3C (PRIOR ART)
FIG. 3*c* illustrates a second end view of the quadrupole illustrated in FIG. 3*a;*
Figure 4B:
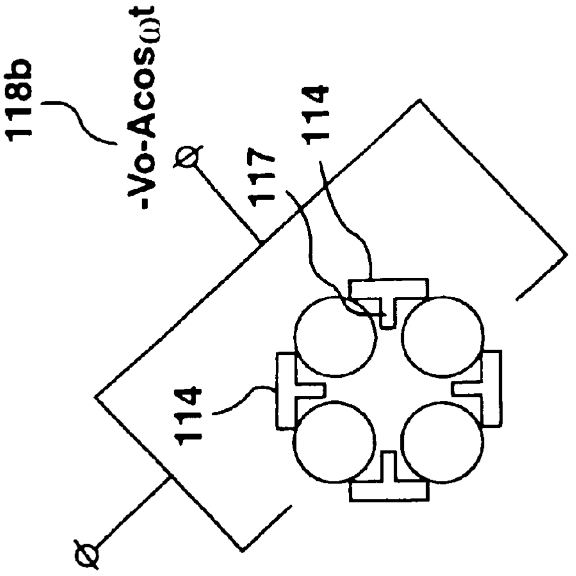
FIGS. 4*a* and 4*b* show schematic cross-section views through a preferred embodiment of the invention.
Figure 4A:
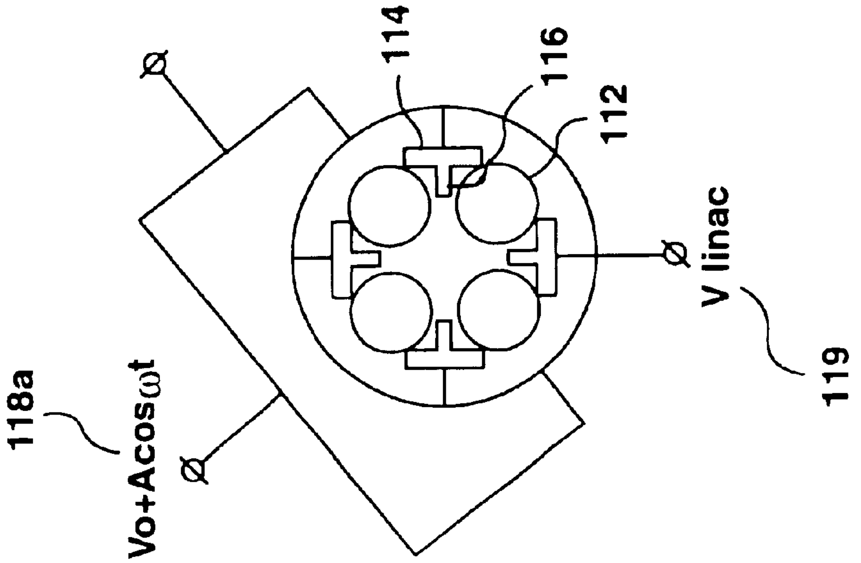

FIG. 3*a* illustrates a side view of a quadrupole 95, in accordance with U.S. Pat. No. 5,847,386. In accordance with the present invention, it is intended to insert this quadrupole 95 in place of quadrupole 34. The quadrupole 95 has a first elongate rod pair 100*a*, 100*b*, wherein each rod 100*a*, 100*b* tapers in cross section along its length. As illustrated, end B (output) of the first rod pair 100_a_, 100_b_ is narrow in cross section, whereas at end A (input), the first rod pair 100_a_, 100 _b_ have an increased cross section. The side view shown in FIG. 3A only shows the first rod pair 100_a_, 100_b_. In order to establish a better understanding of the configuration of the rod pairs, FIGS. 3B and 3C show an end view of the quadrupole 95 looking in at end A (input) and end B (output) respectively. As shown in FIG. 3B, a second elongate rod pair 104_a_, 104_b_ is situated in an orthogonal plane to that of the first rod pair 100_a_, 100_b_. The shape of each elongate rod within the second rod pair 104_a_, 104_b_ is identical to that of the rods comprised in the first rod pair 100_a_, 100_b_ shown in FIG. 3A. However, as illustrated in FIG. 3B, the second rod pair 104_a_, 104_b_ is configured such that at end A they have a narrow cross section, whereas the first rod pair 100_a_, 100_b_ at end A have an increased cross section (also see FIG. 3A). The cross section of the second rod pair 104_a_, 104_b_ increases steadily along its length until it reaches end B, where its cross section is at a maximum. As illustrated in FIG. 3C, at end B, the first rod pair 100_a_, 100_b_ has a narrow cross section and the second rod pair 104_a_, 104_b_ has an increased cross section. Referring to FIG. 3A, this configuration of rod pairs 100_a_, 100_b_, 104_a_, 104_b_ enables the generation of an axially varying DC field along a longitudinal axis, as defined by 102. By applying a voltage differential between the pairs of rods 100 and 104, an axial field is established within the elongate volume, as defined by 106, within quadrupole 95. This configuration is less suitable for a bandpass reactive collision cell, since the bandpass is then a function of distance along the cell. But it is acceptable for a conventional collision or reaction cell. This then applies an axial force to ions within the volume 106. This is achieved by applying a DC bias voltage between two sets of elongate rods, whereby a first DC voltage is applied to the first rod pair 100_a_, 100_b_ and a second, lower DC voltage is applied to the second rod pair 104_a_, 104_b_, to provide a DC potential difference. The axial DC field potential is higher at end A and steadily reduces along the axis 102 in the direction of end B. This causes positive ions entering the quadrupole at end A to accelerate along axis 102 in the direction of end B, where they exit the quadrupole 95. Therefore, the transit time or residence time of the ions in the collision/reaction cell 41 is reduced. This method of improving the time response (or residence time) of the ions in the collision/reaction cell by accelerating them through the quadrupole (or multipole), already exists in assignee's existing LINAC (linear accelerator) technology. The axial field can also reduce the height of the space-charge barrier established within the collision/reaction cell 41, which further reduces the response-time of the ions. A preferred configuration is either a segmented rod set as in FIG. 14 of U.S. Pat. No. 5,847,386, or the use of auxiliary rods as shown in FIG. 21 of U.S. Pat. No. 5,847,386 and a more preferred embodiment of which is shown in FIGS. 4_a_ and 4_b_.

It is also to be appreciated that by reversing the gradient of the axial field along the length of the quadrupole 95, by simply reversing the DC potentials, the mean residence time of the ions can be increased, which in certain instances is particularly useful. These instances occur when for example an unstable or noisy ion source limits the precision of measurements. In this case the residence time of the ions in the collision/reaction cell is desirably prolonged.

More particularly, it is preferred to use an arrangement with auxiliary electrodes, interposed between the rods of a rod set, to provide the axial field. These electrodes are preferably in accordance with FIGS. 4_a_ and 4_b_, and have profiled radially inner surfaces, to give a desired axial field.

it is also to be noted that while reference is made at various places to application of a DC axial field and DC potentials, a pure DC field is not essential. Instead an asymmetric alternating waveform can be used that, time-averaged, gives a net DC component to promote movement of ions in the desired direction.

As suggested above, in some applications, it may prove desirable to reverse the axial field. For example, when measuring isotopes, the ion source can be noisy. In such a case, a reversed field can be used, effectively, to give a trapping effect. This smoothes out the high frequency signal fluctuations. In such a case, a flush pulse can only be used at the beginning of a measurement. Then a pulse of ions is injected and a retarding field applied to "trap" the ions.

Reference will now be made to FIGS. 4_a_ and 4_b_ that show a preferred arrangement for generating an axial field. In addition to the rods 112 that establish the RF/DC-field of the multiple (shown as round cross-sections on the FIG. 4 and comparable to the rod set 34 of FIG. 1), there is provided a plurality of elongated auxiliary electrodes 114, each having a generally T-shaped cross-section. Thus, each auxiliary electrode 114 has a blade section that extends radially inwardly toward the axis of the multipole between the multipole rods 112. The radial depth of this blade section varies along the axis, so that the cross-sections of the auxiliary electrodes 114 vary along the axis. As shown, this profile for the blade section is such that the DC voltage or plurality of voltages applied to the elongated rods 114 establishes a potential on or adjacent the axis that varies along the multipole, thus providing an axial field. For example, the cross section provided in FIG. 4_a_ shows a blade section 116 protruding radially deeper between the rods 112, while cross-section in FIG. 4_b_ shows a shorter blade sections 117 protruding less in the radial direction between the rods 112. By placing the deeper protruding ends 116 or elongated electrodes 112 closer to the entrance of the collision/reaction cell 41, and less protruding ends 117 closer to the exit of the collision/reaction cell 41, and by supplying to the auxiliary elongated electrodes 114 a positive potential relatively to a DC offset potential of the rods 112, one can establish an electrostatic field along the cell, that serves to move positive ions from the entrance to the exit. It is also possible to reverse the configuration of the auxiliary electrodes 113 and to use a negative DC voltage, to achieve the same effect. The distribution of the potential along the multipole is preferably linear, i.e. the axial field is substantially uniform, so as to provide equal force pushing the ions through the multipole to its exit. However it can be made to vary from linear by appropriate tailoring of the profile of the elongated electrodes 114 shape and/or depth of penetration between the multipole rods 112. It has been found that a curved profile is necessary for the blade sections 116, 117, to give a linear potential distribution.

With respect to typical potentials, the end caps of the collision cell are usually at a potential of −10 to −30V DC (all potentials relative to the ion source which is at ground potential). The auxiliary electrodes are commonly at a potential in the range 200–400V DC and this gives a potential drop along or adjacent the axis of the order of 1V. The RF voltage applied to the rods 114 is usually of the order of 200V. The low potential drop along the axis assures that, although ions are efficiently accelerated between collisions, the input of axial field into the collisional energy is relatively low, so that in general, the specificity of the reactive collisions that depends on the energy, is not affected. Alternatively, higher voltages may be applied to the auxiliary electrodes, in order to change collisional energy sufficiently enough to affect the outcome of reactive collisions.

A conventional voltage supply is indicated at 118*a*, 118*b* and connected to the rods 112 in a quadrupolar fashion, for supply RF and DC voltages. A DC voltage source 119 is connected to the auxiliary electrodes 114, as indicated.

Figure 5:
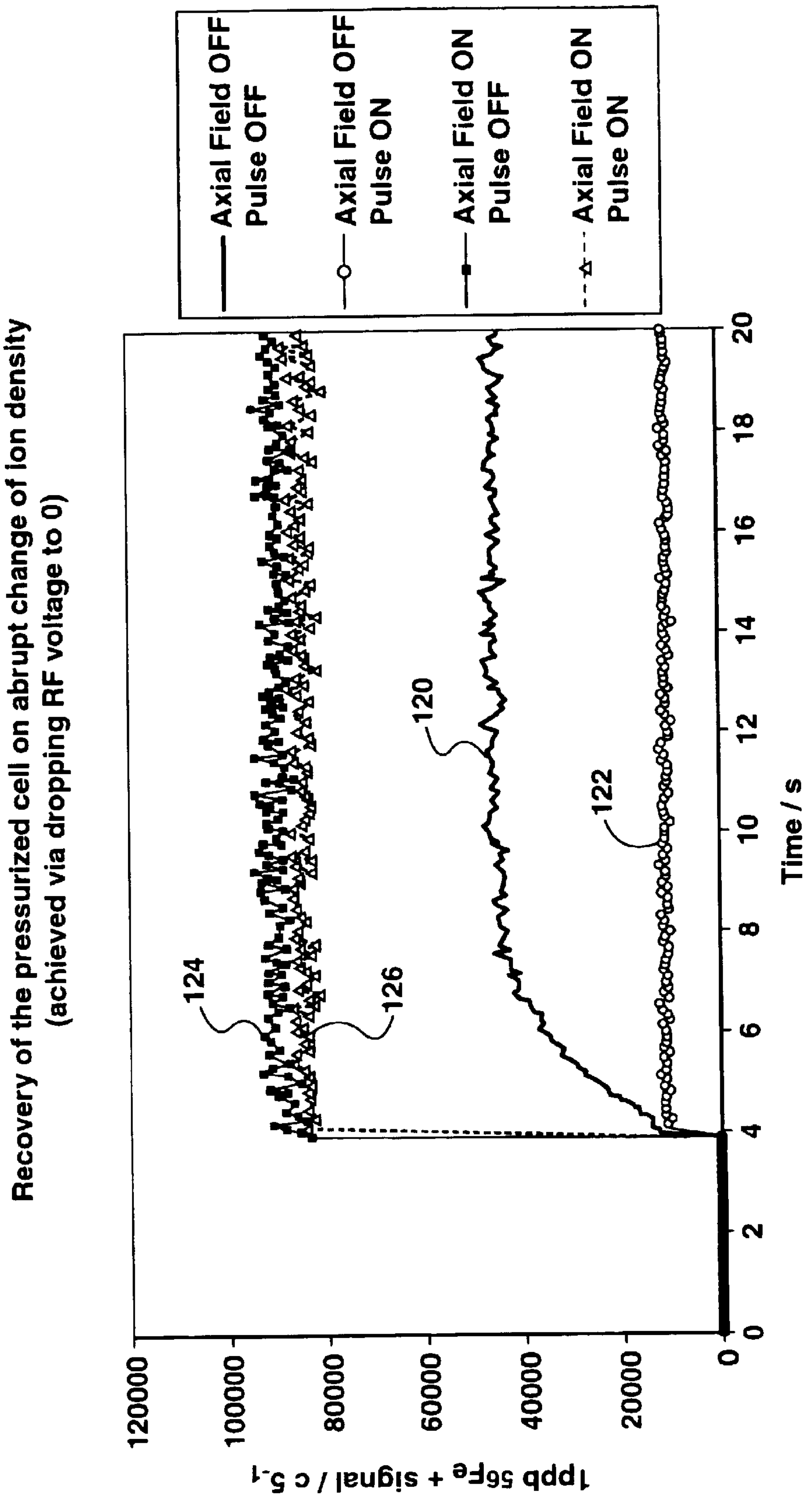
FIG. 5 shows a graph representing the ion signal measured for replicate measurements during the period following a change in the operating RF voltage of the collision/reaction cell, showing the effect of both the axial field and a clearing pulse.

Referring now to FIG. 5, a graph of the ion signals is shown as a function of time for similar measurements after the bandpass of the collision/reaction cell 41 is changed. In this instance, the bandpass is changed by varying the RF amplitude applied to the quadrupole 95, from 0V back to 200V. The ion signal response, as shown at 120, is measured without the application of the axial field along the quadrupole 95 length and without a flush pulse. Every point on the curve represents $^{56}Fe^{+}$ signal measured for 50 ms dwell time after a settling time of 10 ms. As the curve 120 of the ion signal response shows, it takes approximately 4 seconds for the ion signal to reach a value that approximates the steady state signal.

The ion signal response shown as 122 was obtained in the same manner, except that there was applied a flush pulse of amplitude 30V for 10 ms instead of a 10 ms settling time. The measurement was taken in a 50 ms dwell time, following the pulse. At the end of the dwell time, this cycle was repeated with another flush pulse and dwell time. This cycle was repeated every approx. 60 ms to generate the curve 122. While a steady state signal is rapidly established as shown by 122, the signal intensity is reduced by about a factor of 4 compared to the steady state signal shown by curve 120, as the repeated periodic flushing prevents the signal reaching the level of curve 120.

The data of curve 124 were obtained in a manner similar to that of curve 120, but with the addition of just an axial field, applied using the auxiliary electrode configuration of FIG. 4. The signal recovers rapidly to a level about twice that of the steady state of curve 120, but then increases by some 5% over the following approximately 2 seconds.

Now, in accordance with the present invention the curve 126 was obtained in a manner similar to that of 124, but with the addition of a flush pulse (as described for curve 122); again, during the measurement period, there were continuous cycles of flush pulse and dwell time, thus preventing the long term recovery affect seen in curve 124. In this instance, the ion signal recovers rapidly to a stable steady state, and is in addition approximately twice the magnitude of the steady state signal level of curve 120. It is evident that the flush pulse along (curve 122) provides a rapid temporal response, but to a suppressed signal level, where the steady state signal is a function of the settling and dwell times amongst other things (such as input ion current and bandpass state). Application of the axial field along provides a dramatic improvement in temporal response and also provides an enhanced signal level (compared to neither axial field nor flush pulse) but a slowly varying signal is still often observed and it may taken a significant time to reach a steady state (which may be dependent on the input ion current and the bandpass state). Application of both the continuous axial field and the flush pulse, as provided by the present invention, provides a rapid temporal response to a stable steady signal, as well as enhanced sensitivity (compared to neither axial field nor flush pulse), and the steady state signal appears to be loss sensitive to the prior and current change distribution within the cell.

FIG. 5 shows, for demonstration purposes, curves obtained, after the reaction/collision cell was in an emptied state. It is to be noted that similar time responses to those shown in FIG. 5 are observed when the reaction/collision cell bandpass is changed between different operating states, so as to include or exclude a dominant ion. This is important as this is a common mode of operation.

Without the technique of the present invention, the response times of the ion signals are thus a function of the change of bandpass (which ions become or cease to be stable) within the collision/reaction cell 41, when the bandpass is adjusted in concert with the analytical mass. In this instance, the response time is different if the analytical method (the sequence of measuring the ions) is changed. Accordingly, the ion signals measured at a given time after a change of bandpass is a function of the analytical method, provided the ion signals are measured in a time period that is sufficiently short as to prevent equilibration of the ion signals.

Further, if a sample contains a concomitant element at high concentration, the response time will be different than it would be in the absence of the concomitant element, because the concomitant element can affect the charge redistribution in the cell. This compromises the use of external calibration procedures, where the external calibration solution may not contain the concomitant element at comparable concentration, and invalidates the use of blank solutions to measure the blank concentration of the analyte. Similar effects might be observed if the ion current to the cell is changed as a result of changing the sample composition, changing the ion source intensity or changing the focusing characteristics of the ion optics.

In accordance with the present invention, an improvement in the reproducibility of ion signals which is independent of the analytical method (the sequence of measured analyte ions) can be obtained if a flush pulse is activated each time the collision/reaction cell 41 is tuned to receive a new m/z range of sample ions. In one approach, the flush pulse comprises a DC voltage pulse provided between the elongate rods 112, with one diametrically opposed pair of the rods 112 being at one DC potential and the other diametrically opposed pair of rods 112 being at another DC potential. The DC voltage pulse has to be of enough duration to cause a significant fraction of ions residing in the cell to become unstable in the quadrupole field and thus be ejected from it, emptying the cell. The exact pulse duration required for that depends on the magnitude and frequency of the voltages applied to the quadrupole, as well as on the mass-to-charge ratio of the ions to be ejected. For the typical operating parameters of the instrument shown in FIG. 1, a pulse duration in the order of 2 to 100 microseconds should be sufficient. Of course, the pulse duration could be longer; and as noted, the data of FIG. 5 have been obtained with a flush pulse duration of 10 milliseconds. The DC voltage pulse (flush pulse) should be of sufficient amplitude to make all (or most) ions unstable, and should have a duration which ensures that all (or most) ions have been rejected from the cell. The analytical state is then re-established, followed by an optional settling (stabilization) period before analytical measurements are made. If the settling and dwell periods (following the flush pulse) are constant, the ions have a similar history in the cell regardless of the change of bandpass caused by the change in analytical mass (assuming that the bandpass is adjusted in concert with the analytical mass). Accordingly, a reproducible ion signal is obtained which is independent of the analytical method. It should be noted that the ion signal may not stabilize during the settling period, but the recovery should be similar regardless of the change of bandpass state. This assumes a stable input rate of ions to the collision/reaction cell 41.

The effect of the clearing pulse on sensitivity can be seen in FIG. 5, where the signal obtained with the clearing pulse shown as 112 reaches the steady-state level very fast, but is suppressed about 4-fold in comparison to the steady-state signal level acquired with no clearing pulse. The suppression of the signal occurs due to the fact that after being cleared of all ions, the reaction/collision cell recovers slowing but reproducibly to the same low level of signal for each measurement, so that the reading done at the same time after the pulse is always producing the same result, although low in magnitude.

The application of an axial field within the collision/reaction cell greatly decreases the sensitivity penalty encountered by applying a flush pulse, whilst maintaining the advantage of applying the flush pulse following each bandpass change. The clearing pulse removes at least a significant portion of the ions from the cell, after which clearing the recovery of the signal can take a relatively long time—as shown in FIG. 2, of the order of several seconds. However, the clearing pulse establishes a relatively reproducible charge density in the cell every time it is applied. Hence, if one measures the ion signal after the same time delay from the clearing pulse, the signal will be reproducible, even if a steady state condition has not been reached. If this time delay is less than the typical signal recovery time, the level of the measured signal will be a fraction of the steady-state signal. The axial field causes faster establishment of the steady state signal. Thus, the combination of the two, where the clearing pulse provides a reproducible charge density in the cell before each measurement independent of the previous charge density state of the cell, and the axial field allows faster establishment of the new steady-state charge-density, provides fast temporal response of the cell shown in FIG. 5 as 126 Although the flush pulse improves the temporal response of the spectrometer system and, to some extent, counteracts the advantages (as shown by the difference between curves 124 and 126) of the axial field, the combination of both techniques offers a compromise solution which encompasses their joint advantages. When combined, the axial field restores the ion signal within about 2 ms following a flush pulse. Furthermore the flush pulse establishes a reproducible ion signal condition within the collision/reaction cell 41 following bandpass changes. Hence, the ion signal measurements are not a function of the previously distributed charge within the collision/reaction cell 41.

Figure 6:
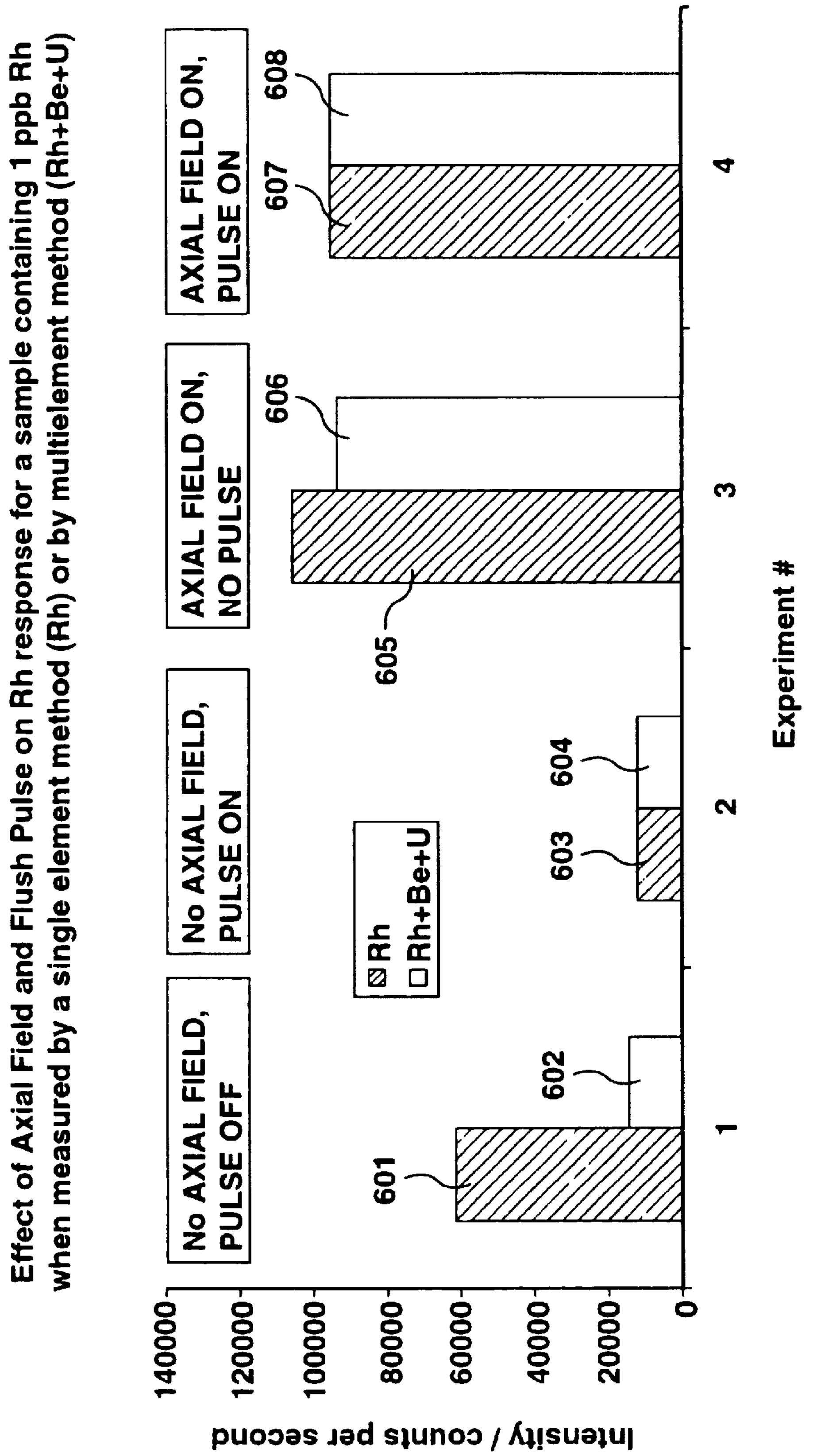
FIG. 6 shows a graph representing the intensity of 103 Rh+ signal for 1 ppb Rh signal measured when the data acquisition method measures only single m/z=103 or when it also contains m/z=9 (Be) and m/z=238 (U) with either activation or de-activation of the axial field and/or clearing pulse.

Reference will now be made to FIG. 6, which illustrates several analytical measurements made with the application of an axial field to the collision/reaction cell 41. The ion signal at m/z=103 was measured either in a single-isotope acquisition method, where the signal is measured at the same mass for a measurement period of 50 ms for 10 consecutive replicates with a 10 ms settling time before each measurement (between the replicates), or in a multi-element acquisition method, where ion signals at m/z=9, m/z=103 and m/z=238 are detected with 10 ms settling time between each measurement of 50 ms duration. When the 103 $Rh^+$ signal for a sample containing a 1 ppb of Rh is measured with only m/z=103 present in the acquisition method (shown as bar 601 in FIG. 6), the response is ca. 62,000 counts per second. When other m/z are measured concomitantly (and thus a bandpass change occurs every time m/z is changed), the response drops to ca. 14,000 counts per second (Bar 602). The sensitivity drop occurs due to the fact that during the settling time of 10 ms after the bandpass change, the steady state charge density in the cell is not established, thus each time the measurement is done the signal is recovered only to a fraction of its steady-state value.

When a flush pulse is applied, it reproducibly establishes the same charge-density in the cell before the measurement, independently of whether the bandpass is the same or changed. Bar 603 shows the response when only m/z=103 is measured (the bandpass remains constant) and the pulse is applied, and bar 604 gives the signal when the m/z is changed (i.e. m/z=9(Be) and m/z=238(U) are included in the method) and the pulse is applied. In both cases the response is about 13,000 counts per second and is independent of whether or not the bandpass was changed before the measurement.

Application of an axial field along the multipole of the collision/reaction cell, provides fast establishment of the steady-state charge density distribution such that a signal of about 107,000 counts per second is measured after only 10 ms settling time (bar 605). A higher signal is obtained with the axial field as compared to no axial field due to increased collection efficiency of collisionally scattered ions achieved when the axial field is applied. However, the steady state of the charge density, although established within 10 ms, is dependent on the previous charge density state in the cell—thus the signal level still depends on whether the bandpass is changed (bar 606) or kept constant (bar 605), although to a lesser extent than with no axial field, being ca. 95,000 which is ca. 89% of a single-element method signal.

Using the flush pulse to establish a reproducible initial charge density in the cell before the measurement and concomitantly applying an axial field to quickly establish the steady-state charge density after the pulse allows reproducible and precise measurements of the $Rh^+$ signal independent of the bandpass charge of the cell (bars 607 and 608).

(It is to be noted that the test solution contained only Rh with no Be or U or other elements. The test just shows that the response is a function of the analytical method, whether or not there are actually ions at the given masses to be measured. Again, it is likely due to the inclusion/exclusion of dominant plasma ions in the various bandpasses.)

Accordingly, the combined axial field and flush pulse provide reproducible ion signals that are independent of the prior charge distribution in the cell and are relatively independent of settling and dwell time. If it is necessary to ensure that the flush pulse empties (causes all or most ions to become unstable) the collision/reaction cell 41, the applied DC amplitude voltage (Vdc), which is the combined amplitude of the DC voltage applied before the flush pulse, and the amplitude of the pulse must be at least in the region of 0.17 (17%) of the rf amplitude voltage (Vrf), which is also applied to the collision/reaction cell 41. For some applications, it may not be necessary to completely empty the cell during the flush, and a reduction in charge might be sufficient to obtain a benefit. Each flush pulse can have a duration of 2 to 100 microseconds or several rf cycles, where the rf cycles are related to the rf signal frequency applied to the collision/reaction cell 41 for changing its bandpass.

Note that if a DC resolving voltage is applied between the pole pairs in order to provide for high mass cut-off, the pulse amplitude required to completely empty the cell, is less than if there was no DC resolving voltage applied before the pulse. Thus, it is the combined DC voltage amplitude, not only the pulse itself, that should be >17% of the RF amplitude.

There are several methods of emptying the cell using the rf signal itself, such as: reducing the rf amplitude, typically to less than one-half the amplitude applied during analytical measurement (while retaining the rf frequency applied during analytical measurement); increasing the rf amplitude, typically to greater than twice the amplitude applied during analytical measurements (while retaining the rf frequency applied during analytical measurement); increasing the rf frequency, typically to more than 150% of the frequency applied during analytical measurement (while retaining the rf amplitude applied during analytical measurement); decreasing the rf frequency, typically to less than 75% of the frequency applied during analytical measurement (while retaining the rf amplitude applied during analytical measurement); reducing the ion current introduced into the cell, possibly through shutting off the source of ionization or through defocusing the ions in the ion optics in front of the cell; adjustment of either or both of the end cap voltages in a manner to induce the ions to rapidly exit the cell; raising the DC offset potential of the rod pairs 112 (DC potential applied to all of the rods simultaneously and equally) to a high enough value in order to stop the ions (supposedly to cause the space charge to increase and hence to self-eject a majority of the ions); or application of an auxiliary rf potential to one or each pair of rods in a manner to induce the ions to rapidly exit the cell.

Consequently, the DC and RF power supply 56 (see FIG. 1) which is connected to the quadrupoles 34 of collision/reaction cell 41, may also act as a flush pulse generator or source (by varying rf amplitude or frequency) for emptying or rendering existing ions within the cell 41 unstable. It will also be appreciated that in an alternative embodiment, a separate DC pulse generating circuit may be connected to quadrupole 34 and/or to other elements of the mass spectrometer 10, in addition to the RF signals and DC voltages provided by power supply 56. In this embodiment the bandpass control of the cell 41 and the DC axial field voltages are provided by power supply 56, whereas the separate DC pulse generating circuit generates the flush pulse. In other embodiments, the flush pulse can be implemented by pulsing the auxiliary electrodes 114 as per FIG. 4*a, b* that are otherwise used for establishing the axial field.

As previously mentioned, the flush pulse is applied to the collision/reaction cell 41 each time the m/z range is tuned to a new bandpass value. Also, the mass analyzer 66 and the collision/reaction cell 41 are tuned in concert with one another. This is the case for dynamic reaction cells produced by the assignee of the present invention and also in many standard spectrometer.

The flush pulse can also be used as a synchronization signal, wherein the synchronization signal is supplied to the computer 70 for determining each new bandpass value selected by the collision/reaction cell 41 and mass analyzer 66. (This finds value in the temporal resolution of isobars, as described in U.S. application Ser. No. 09/718,505, filed Nov. 24, 2000, the contents of which are hereby incorporated by reference.

It should be understood that various modifications can be made to the preferred and alternative embodiments described and illustrated herein, the scope of which is defined in the appended claims.

This is all very specific to the bandpass reactive collision cell. A similar effect is likely observed if the cell is operated rf-only where the cell is capacitively coupled to the mass filter. It could also apply even to a fixed bandpass cell if the ion current entering the cell is variable (as in a transient signal measurement from a transient ion source or pulsed ion optics), or if the mass distribution of the ion introduced into the cell is variable, or if one of the cell parameters is changed (effect on tuning optimization), or if the pressure is abruptly changed or the source or upstream optics are adjusted. Similarly, we have described the flush pulse method were a DC pulse is applied between pole pairs of the DRC quadrupole—other methods of quickly emptying the cell are also possible (some of which are captured in the claims).

What is claimed is:

1. A method of operating a mass spectrometer system including a processing section having an input and an output, the method comprising:

(i) providing a stream of ions to the input of the processing section;

(ii) passing the stream of ions through the processing section, at least part of which is operated under conditions enabling collisions of ions with neutral (gas) particles;

(iii) detecting ions exiting from the output of the processing section;

(iv) providing an axial field within the processing section from the input to the output, to promote movement of ions through the processing section; and (v) periodically providing a flush pulse to the processing section to cause rejection of at least some ions present in the processing section.

2. A method as claimed in claim 1, which includes periodically changing operating parameters of the processing section from one operating state to another operating state and then applying the flush pulse, whereby subsequent detection of ions exiting the processing section detects only ions during said other operating state.

3. A method as claimed in claim 1, which includes providing the processing section with a multipole rod set comprising a plurality of elongate rods, and providing at least one voltage to the elongate rods to generate said axial field, and wherein the method further includes providing at least an RF voltage to the multipole rod set to maintain desired ions stable within the multipole rod set.

4. A method as claimed in claim 3, which includes providing tapered rods tapering in diameter from one end to the other, for generating the axial field.

5. A method as claimed in claim 4, which includes providing the multipole rod set comprising a first plurality of rods whose diameter tapers downwards from a relatively large diameter at the input to a relatively small diameter at the output and a second plurality of rods whose diameter tapers downwards from a relatively large diameter at the output to a relatively small diameter at the input which alternate with the rods of the first plurality of rods.

6. A method as claimed in claim 5, which includes providing the multipole rod set as a quadrupole rod set comprising a first pair of diagonally opposed rods whose diameter tapers downwards from a relatively large diameter at the input to a relatively small diameter at the output and a second pair of diagonally opposed rods whose diameter tapers downwards from a relatively large diameter at the output to a relatively small diameter at the input.

7. A method as claimed in claim 3, which includes providing the elongate rods as segmented rods and providing a plurality of separate voltages to individual rod segments thereby to generate the axial field.

8. A method as claimed in claim 1, which includes providing the processing section with a multipole rod set comprising a plurality of elongate rods and providing at least an RF signal to the multipole rod set to maintain desired ions stable within the multipole rod set, wherein the method includes providing a set of auxiliary electrodes interposed between the elongate rods, and applying at least one voltage to the auxiliary electrodes to generate the axial field.

9. A method as claimed in claim 8, which includes providing the auxiliary electrodes with sections extending radially inwards, wherein the radial extent of said sections varies along the axis, whereby the voltage applied to the electrodes generates the axial field.

10. A method as claimed in claim 8 or 9, which includes providing each of the auxiliary electrodes as a segmented electrode and applying different voltages to the segment auxiliary electrodes, thereby to generate the axial field.

11. A method as claimed in claim 8 which includes providing the flush pulse by applying an appropriate signal to said auxiliary electrodes, said signal being of sufficient amplitude and duration to cause ejection of at least some of the ions within said processing section.

12. A method as claimed in claim 3 or 8, which includes providing the multipole rod set in a housing and supplying a gas to the housing for at least one of reaction and collision with the ion stream and applying at least said RF signal to the multipole rod set to establish a desired pass band within the multipole rod set, whereby the multipole rod set forms one of a collision cell and a reaction cell.

13. A method as claimed in claim 12, which includes mass analyzing ions exiting from the processing section.

14. A method as claimed in claim 12, which includes first passing the ion stream through a first mass analyzer to select ions having a desired m/z ratio, subsequently passing the ions through the multipole rod set for one of reaction and collision, and analyzing at least one of the secondary ions generated in the multipole rod set and the primary ions in another mass analyzer.

15. A method as claimed in claim 12, which includes changing the operating parameters in step (v) by changing from one operating state to another operating state, which changes selected ions having an m/z ratio in one range of values to selected ions having an m/z ratio in a second range of values.

16. A method as claimed in claim 3, which includes providing the multipole rod set in a housing and supplying a gas to the housing for one of reaction and collision with the ion stream and applying at least said RF signal to the multipole rod set to establish a desired pass band within the multipole rod set, whereby the multipole rod set forms one of a collision cell and a reaction cell.

17. A method as claimed in claim 3, 8 or 16, which the flush pulse comprises a DC voltage pulse of sufficient amplitude applied between the rods for a duration sufficient to eject at least a portion of the ions from the cell.

18. A method as claimed in claim 17, which includes applying the DC voltage with a value equivalent to at least 17% of the amplitude of the RF signal.

19. A method as claimed in claim 3, 8 or 16, which includes providing said flush pulse by reducing the amplitude of said RF signal to a value sufficient to cause ejection of unwanted ions, while maintaining the frequency of said RF signal the same as during transmission of ions.

20. A method as claimed in claim 3, 8 or 16, which includes providing said flush pulse by increasing the amplitude of said RF signal to a value sufficient to cause ejection of unwanted ions, while maintaining the frequency of said RF signal the same as during transmission of ions.

21. A method as claimed in claim 3, 8 or 16, which includes providing said flush pulse by reducing the frequency of the RF signal to a value sufficient to cause ejection of unwanted ions, while maintaining the amplitude of the RF signal the same as during transmission of ions.

22. A method as claimed in claim 3, 8 or 16, which includes providing the flush pulse by increasing the frequency of said RF signal to a value sufficient to cause ejection on unwanted ions, while maintaining the amplified of the RF signal the same as during transmission of ions.

23. A method as claimed in claim 2, 3, 8 or 16, wherein an ion current is transmitted into the processing section, said ion current entering said processing section being changed by means of ion optics devices.

24. A method as claimed in claim 23, wherein said ion optics devices defocus said ion current entering said collision/reaction cell, whereby the ion optics causes said ion current entering said collision/reaction cell to be reduced.

25. A method as claimed in claim 3, 8 or 16, wherein a DC voltage is applied to said elongate members, said DC potential being high enough to self eject said existing ions within said collision/reaction cell.

26. A method as claimed in claim 3, which includes providing the flush pulse by providing a pulse to a common rod offset voltage applied to multipole rod set.

27. A method as claimed in claim 3, which includes providing the multipole rod set in a cell including end caps and providing the flush pulse by providing a voltage pulse to at least one of the end caps.

28. A method as claimed in claim 3, which includes providing a reverse axial field in step (iv) to decelerate ions, thereby to increase transit time of ions.

29. A method as claimed in claim 3, wherein the elongate rods of the multipole rod set are arranged tilted relative to the axis of the multipole rod set, whereby application of a potential to the rods generates the axial field.

30. A mass spectrometer apparatus including at least one processing section, said processing section comprising:

(i) a multipole rod set comprising a plurality of elongate rods and an input and an output;

(ii) means for supplying an RF voltage to the multipole rods;

(iii) means for generating an axial field inside the rod set for promoting movement of ions in one direction; and (iv) flush pulse means for generating a flush pulse for rejecting at least some ions present in the processing section, said flush pulse means being connected to the processing section, whereby application of the flush pulse causes an abrupt change in the ion population in the processing section.

31. An apparatus as claimed in claim 30, wherein the processing section includes a DC power supply connected to the multipole rod set for applying a resolving DC voltage to the multipole rod set, to enable a bandpass to be set for ions in a desired range of m/z ratios.

32. An apparatus as claimed in claim 30, wherein the means for generating an axial field comprises a plurality of auxiliary electrodes alternating with the elongate rods of the multipole rod set, and a DC voltage source connected to the auxiliary electrodes.

33. An apparatus as claimed in claim 31 or 32, wherein each of the rods comprises a plurality of rod segments, and wherein said DC power supply means is connected to the individual rod segments and comprises means for applying separate DC offset voltages to the rod segments thereby to generate the axial DC field.

34. An apparatus as claimed in claim 31 or 32, wherein the processing section comprises one of a collision cell and a reaction cell, including an inlet for one of a collision gas and a reaction gas.

35. An apparatus as claimed in claim 32, which includes a mass analyzer downstream from the processing section.

36. An apparatus as claimed in claim 32, wherein the mass analyzer includes a detector.

37. An apparatus as claimed in claim 34, which includes a first mass analyzer upstream from said processing section, for selecting the m/z ratio of ions for transmission into the processing section and a second mass analyzer provided downstream from the processing section for analyzing ions exiting from the processing section.

38. An apparatus as claimed in claim 30, wherein the means for generating an axial field comprises a plurality of auxiliary electrodes alternating with the elongate rods of the multipole rod set, and an asymmetric voltage waveform source is connected to the auxiliary electrodes.

39. An apparatus as claimed in claim 30, wherein the means for generating an axial field is adapted to generate a retarding axial field in order to control the response time of the processing section.

* * * * *